US010443613B2

(12) United States Patent
Malmborg

(10) Patent No.: US 10,443,613 B2
(45) Date of Patent: Oct. 15, 2019

(54) HOLLOW FAN BLADE WITH STRUCTURAL RIBS

(71) Applicant: UNITED TECHNOLOGIES CORPORATION, Farmington, CT (US)

(72) Inventor: Eric W. Malmborg, Amston, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 188 days.

(21) Appl. No.: 15/609,984

(22) Filed: May 31, 2017

(65) Prior Publication Data
US 2018/0347582 A1 Dec. 6, 2018

(51) Int. Cl.
F01D 5/18 (2006.01)
F01D 5/14 (2006.01)
F04D 29/38 (2006.01)
F01D 9/04 (2006.01)
B23P 15/04 (2006.01)
F04D 29/32 (2006.01)

(52) U.S. Cl.
CPC ............ F04D 29/388 (2013.01); B23P 15/04 (2013.01); F01D 5/147 (2013.01); F01D 5/18 (2013.01); F01D 9/041 (2013.01); F04D 29/325 (2013.01)

(58) Field of Classification Search
CPC . F01D 5/147; F01D 5/18; F01D 9/041; F04D 29/388
See application file for complete search history.

(56) References Cited

U.S. PATENT DOCUMENTS

| 6,431,837 | B1 | 8/2002 | Velicki | |
| 2014/0241897 | A1 | 8/2014 | Bales et al. | |
| 2015/0226068 | A1* | 8/2015 | Maurizio | F04D 29/023 416/223 A |
| 2015/0252675 | A1 | 9/2015 | Radomski | |
| 2016/0177732 | A1 | 6/2016 | Whitehurst et al. | |
| 2017/0023007 | A1* | 1/2017 | Roche | F01D 5/147 |

FOREIGN PATENT DOCUMENTS

| EP | 2243929 A2 | 10/2010 |
| EP | 2500263 A2 | 9/2012 |
| EP | 2727681 A1 | 5/2014 |
| WO | 2015102691 A2 | 7/2015 |

OTHER PUBLICATIONS

European Search Report for Application No. 18173440.1-1006; dated Aug. 3, 2018; 10 pgs.

* cited by examiner

Primary Examiner — Patrick Hamo
(74) Attorney, Agent, or Firm — Cantor Colburn LLP

(57) ABSTRACT

Disclosed is a fan blade for a gas turbine engine, including: a first member and a second member; the first member having a first surface and the second member having a second surface, each of the first surface and the second surface extending from a leading edge to a trailing edge of the fan blade and from a tip edge to or proximate to a root of the fan blade; the first surface being externally facing and being one of concave or convex between the leading edge and the trailing edge and the second surface being externally facing and being another of convex or concave between the leading edge and the trailing edge; the second member including structural ribs extending to the first member, and the first member being bonded to the second member at free edges of the structural ribs and about a perimeter of the fan blade.

5 Claims, 3 Drawing Sheets

HOLLOW FAN BLADE WITH STRUCTURAL RIBS

BACKGROUND

Exemplary embodiments pertain to the art of fan blade configurations and more specifically to a hollow fan blade.

Solid titanium fan blades may often be too heavy for large diameter installations. Therefore, there is a need to reduce weight while maintaining structural integrity of the fan blade.

BRIEF DESCRIPTION

Disclosed is a fan blade for a gas turbine engine, comprising: a first member and a second member; the first member having a first surface and the second member having a second surface, each of the first surface and the second surface extending from a leading edge to a trailing edge of the fan blade and from a tip edge to or proximate to a root of the fan blade; the first surface being externally facing and being one of concave or convex between the leading edge and the trailing edge and the second surface being externally facing and being another of convex or concave between the leading edge and the trailing edge; and wherein the second member includes structural ribs extending to the first member, and wherein the first member is bonded to the second member at free edges of the structural ribs and about a perimeter of the fan blade.

In addition to one or more of the features described above, or as an alternative, further embodiments may include that the first surface is concave between the leading edge and the trailing edge.

In addition to one or more of the features described above, or as an alternative, further embodiments may include that the first member has a constant or variable thickness.

In addition to one or more of the features described above, or as an alternative, further embodiments may include that the first member and second member are both unitary members.

In addition to one or more of the features described above, or as an alternative, further embodiments may include that the structural ribs include a plurality of spaced apart span-wise ribs and a plurality of spaced apart chord-wise ribs.

In addition to one or more of the features described above, or as an alternative, further embodiments may include that the second member comprises a root core and the first member comprises a root edge radially spaced from the root core.

In addition to one or more of the features described above, or as an alternative, further embodiments may include that the first member comprises a first portion of a root core, the second member comprises a second portion of the root core and a third member bonded to the first member comprises a third portion of the root core.

Further disclosed is a gas turbine engine comprising a fan blade having one or more of the above disclosed features. Yet further disclosed is a method of manufacturing a fan blade for a gas turbine engine, comprising: positioning a first member against a second member, the first member having a first surface and the second member having a second surface, each of the first surface and the second surface extending from a leading edge to a trailing edge of the fan blade and from a tip edge to or proximate to a root of the fan blade, wherein the second member includes structural ribs extending to the first member; and bonding the second member to the first member at free edges of the structural ribs and about a perimeter of the fan blade.

In addition to one or more of the features described above, or as an alternative, further embodiments may include that when the first member is positioned against the second member, the first surface is externally facing and is one of concave or convex between the leading edge and the trailing edge and the second surface is externally facing and is another of convex or concave between the leading edge and the trailing edge.

In addition to one or more of the features described above, or as an alternative, further embodiments may include that when the first member is positioned against the second member, the first member is planar and the second surface is externally facing and is one of convex or concave between the leading edge and the trailing edge, and the method further includes bending the first member so that the first surface forms another of convex or concave between the leading edge and the trailing edge.

In addition to one or more of the features described above, or as an alternative, further embodiments may include that the second member comprises a root core and the first member comprises a root edge radially spaced from the root core.

In addition to one or more of the features described above, or as an alternative, further embodiments may include that the second member comprises a first portion of a root core and the second member comprises a second portion of the root core and the method includes bonding a third member against the first face of the first member, wherein the third member comprises a third portion of the root core.

In addition to one or more of the features described above, or as an alternative, following the bonding step further embodiments may include removing portions of the first member that extend past the second member at the leading edge, the trailing edge, the tip and the root.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
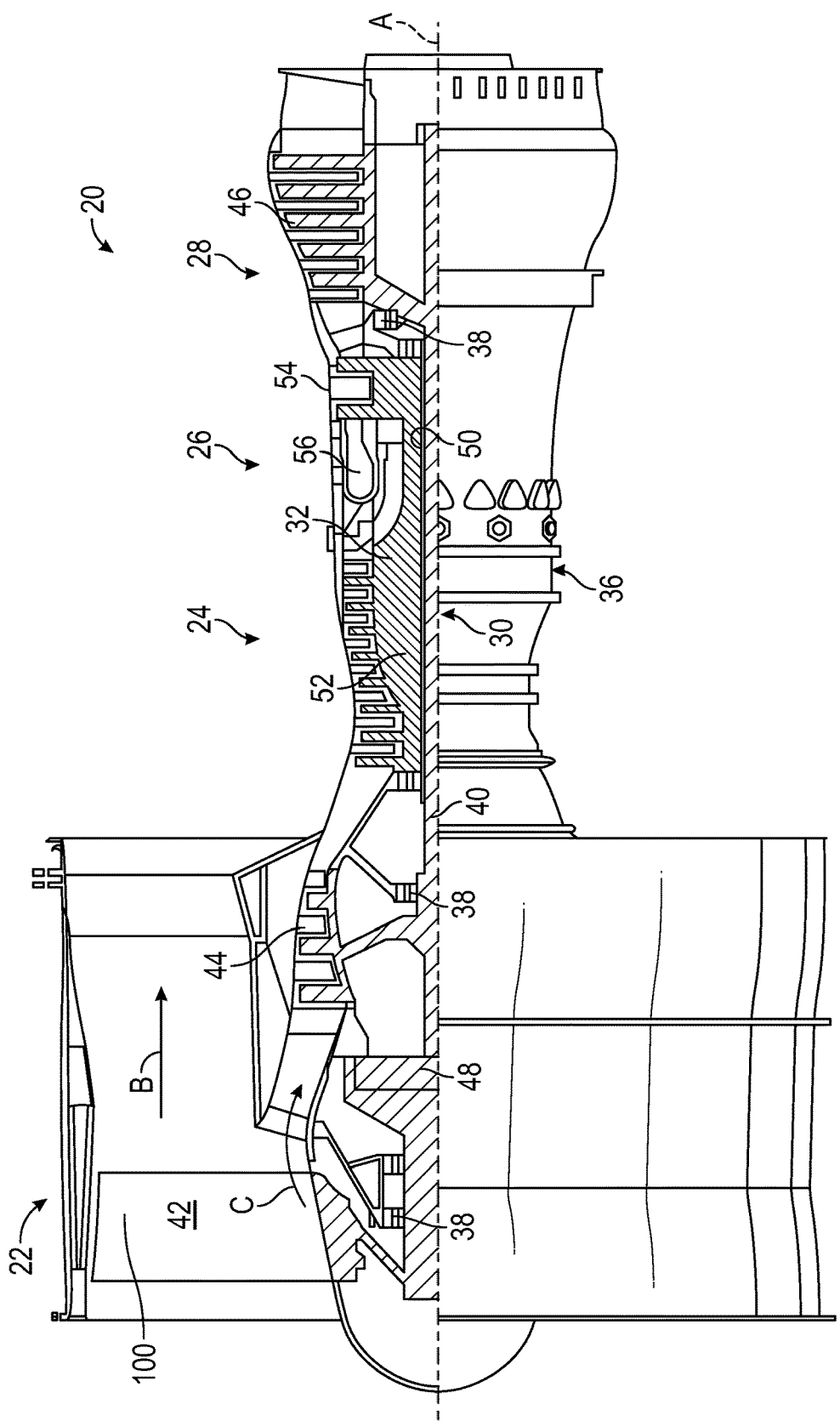
FIG. 1 is a partial cross section of a gas turbine engine according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Further reference to features of the disclosed embodiments is made relative to a typical cylindrical coordinate system. The engine axis A illustrated in FIG. 1 is disposed along a longitudinal axis of the coordinate system and at a radial center or inner most portion of the coordinate system. The engine turbine section 28 is disposed downstream or aft of the compressor section 24.

Figure 2A:
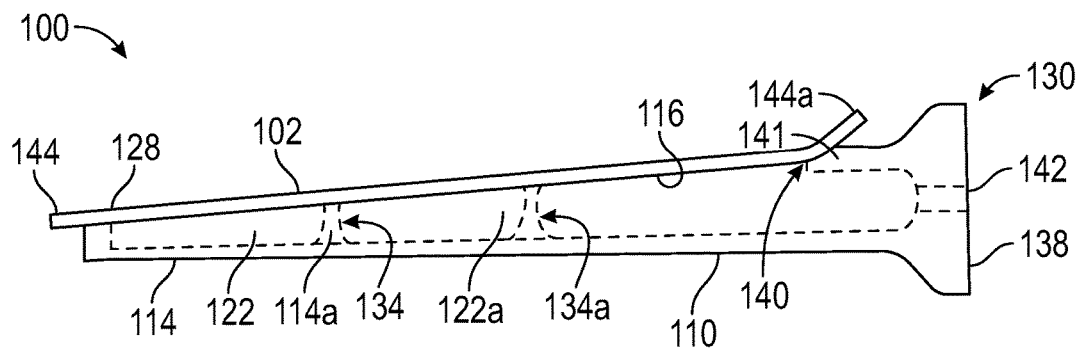
FIGS. 2A and 2B are a side and top cross sectional view of a partially manufactured fan blade according to an embodiment.
Figure 2B:
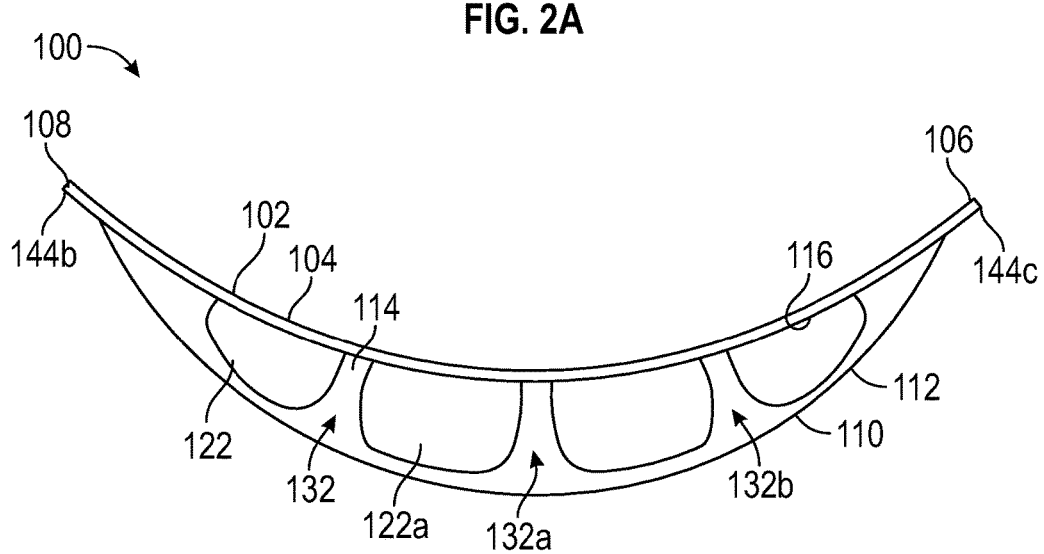

Turning to FIGS. 1, 2a and 2b, a fan blade 100 may have a first member 102 which may have a first surface 104 that may be concave between a leading edge 106 and a trailing edge 108 of the fan blade 100. However, an embodiment in which the first surface 104 may be convex between the leading edge 106 and trailing edge 108 is within the scope of the disclosure. The first surface 104 may be outwardly facing and the first member 102 may be a pressure side member. The first member 102 may be unitary, rib-less, and may have a substantially constant thickness, though a variable thickness is within the scope of the disclosure.

The fan blade 100 may have a second member 110 which may have a second surface 112 that may be convex between the leading edge 106 and trailing edge 108. The second surface 112 may be outwardly facing so that the second member 110 may be a suction side member. The second member 110 may be unitary and contain a plurality of structural support ribs 114, 114a extending therefrom toward and terminating at the first member 102. As such the second member 110 may define the blade body and the second surface 112 may define the cover of the blade body 110. The first member 102 and second member 110 may be mechanically connected by bonding along a concave or suction facing side 116 of the first member 102.

The fan blade 100 may have a solidity region and hollow regions 122, 122a. The solidity region may be defined by locations where the first member 102 and second member 110 are mechanically connected. The solidity region may include the full perimeter of the fan blade 100, including the leading edge 106, the trailing edge 108, a fan blade tip 128 and a fan blade root 130, and where the support ribs 114 connect with the first member 102. The hollow region 122 may be the non-connecting region between the first member 102 and the second member 110, i.e., cavities defined by spaces between structural support ribs 114 and the first member 102.

The support ribs 114, 114a may include a plurality of spaced apart span-wise extending ribs 132, 132a, 132b illustrated in FIG. 2b and a plurality of spaced apart chord-wise extending ribs 134, 134a illustrated in FIG. 2a. As illustrated there may be three span-wise extending ribs 132, 132a, 132b spaced at substantially similar intervals between the leading edge 106 and the trailing edge 108. There may be two cord-wise ribs 134, 134a disposed toward the blade tip 128, that is, further away from the root 130. The number of ribs illustrated in either direction in the accompanying figures is not intended to limit the options available to one of ordinary skill. Both the span-wise and chord-wise ribs provide a shear tie between the blade body 110 and the blade cover 112.

The root 130 of the blade 100 may have a radial inner portion 138 which is the root core. The root core 138 may be effectively a solid mass sized to connect with a disk and be subjected to rotational forces at the blade-disk interface. To avoid imparting excess stresses on the relatively thin first member 102, a root edge 140 of the first member 102 may terminate at a seat 141 in the root portion 130 of the solidity region, radially spaced from the root core 138. The root edge 140 may be curved towards the pressure side in order to bond to the seat 141. As can be appreciated the first member 102 may have a complex curvature defined by both the camber of the fan blade 100 and the curvature at the location were bonding to the seat 141.

The second member 110 may be milled out of a solid material or cast. The root core 138 may be fabricated with one or more gas ports 142 typical for the manufacturing purpose.

As illustrated in FIGS. 2a and 2b, the first member 102 may be oversized so that bonding between the first member 102 and second member 110 results in skin extensions 144, 144a, 144b, 144c around the blade perimeter. Bonding away from the edges of the first member 102 may provide a structure with better material strength characteristics than by bonding at the edges. Skin extension 144 may be removed after the fan blade 100 is assembled.

Figure 3A:
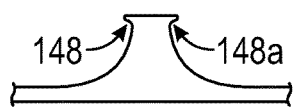
FIGS. 3A, 3B and 3C are profile views of structural ribs according to an embodiment.
Figure 3B:
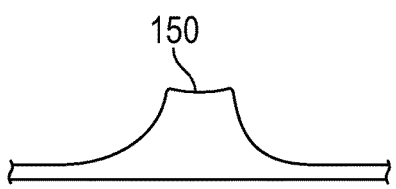
Figure 3C:
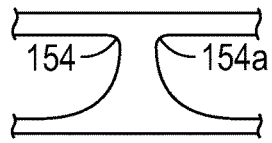

Ribs 114 may be bonded at its edges to the first member 102 via diffusion bonding. As illustrated in FIGS. 3a, 3b, 3c, ribs 114 may include edges having one or more of fillets 148, 148a a divot 150 and radii 154, 154a. Each of these configurations at the binding interface between the ribs 114 and the first member 102 may provide a more structurally sound connection therebetween.

Figure 4:
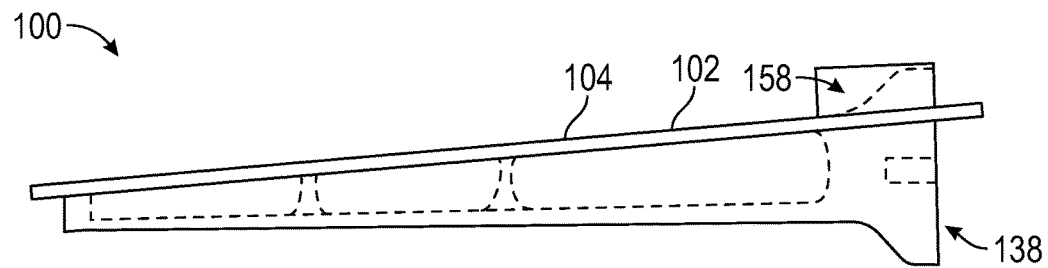
FIG. 4 is a side cross sectional view of a partially manufactured fan blade according to an embodiment.
Figure 5:
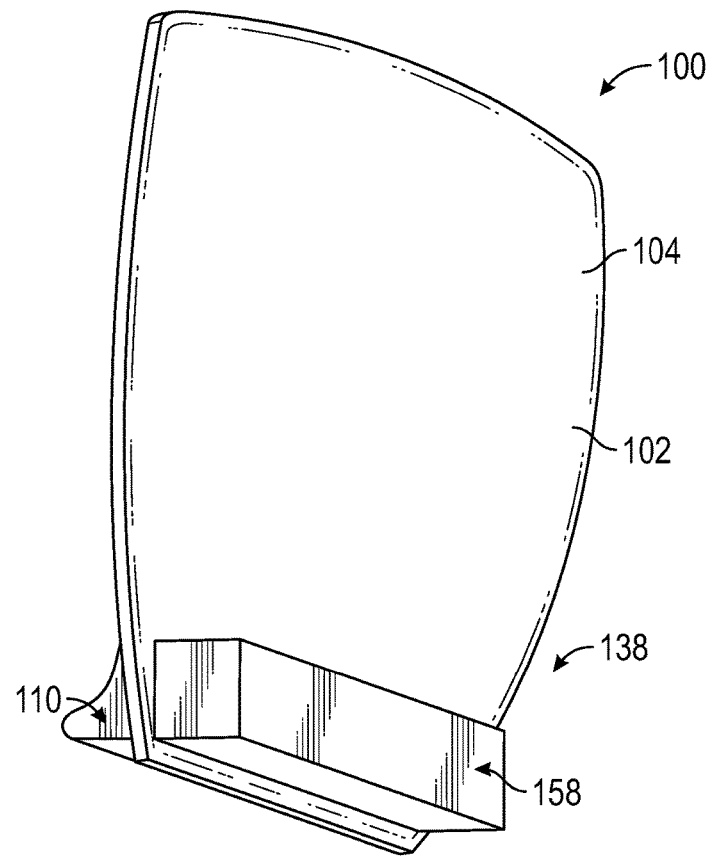
FIG. 5 is a perspective view of a partially manufactured fan blade according to an embodiment.

In an alternative embodiment illustrated in FIGS. 4 and 5, the root core 138 may be a composite of three pieces of material, including the first member 102, second member 110, and a third member 158. The third member 158 may be a block bonded to the pressure side 104 of the skin 102. The profile of the root core 138 on the pressure side 104 of the resulting fan blade 100 may be milled out of the block 158. One benefit of this embodiment is not needing to impart the above noted complex curvature in the first member 102 in order to bond with the seat 141 in the above disclosed embodiment, and avoiding related strain hardening.

The above disclosed embodiments may provide a light weight fan blade 100 having structural integrity. The disclosed embodiments may combine a machined body that includes cavities between ribs 114 that may be sealed by diffusion bonding to the first member 102, which may be a sheet of titanium. The first member 102 may be constant thickness or tapered. After the second member 110 which defines the blade body and first member are bonded the fan blade 100 may be completed using conventional airfoil machining methods.

The first member 102 may be bonded to the pressure surface of the second member 110 or blade body, as this positions the bond interface nearer to a flatwise bending neutral axis to minimize stress. Additionally, the first member 102 sheet may be oversized relative to the second member 110 or blade body to avoid or eliminate the stress concentrations associated with creating a frame that it is positioned within.

The first member 102 may be bonded in either a flat or twisted state to the second member 110 or blade body. Bonding in the flat state may require additional hot operations to achieve the twisted state. In either case, the process may avoid the step of aligning the ribs of two detail machined halves as is typically performed in the art, thus minimizing stress concentrations.

Benefits of the disclosed embodiments may include cost reductions relative to a conventional two piece configurations for fan blades 100 and manufacturing process therefore. Cost reduction may be realized with the ability to machining a first member 102, which functions as a blade skin, a second member 110, which functions as a blade ribbed body, where only one part is more structurally complex than a flat piece of material. This configuration may eliminate detailed part alignment concerns for removing machined features on the second part.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing a fan blade for a gas turbine engine, comprising:

positioning a first member against a second member, the first member having a first surface and the second member having a second surface, each of the first surface and the second surface extending from a leading edge to a trailing edge of the fan blade and from a tip edge to or proximate to a root of the fan blade, wherein the second member includes structural ribs extending to the first member; and bonding the second member to the first member at free edges of the structural ribs and about a perimeter of the fan blade;

the first member being sized so that bonding between the first member and second member results in skin extensions around the blade perimeter, whereby the bonding occurs away from the edges of the first member; and removing the skin extensions after bonding.

2. The method of claim 1, wherein when the first member is positioned against the second member, the first surface is externally facing and is one of concave or convex between the leading edge and the trailing edge and the second surface is externally facing and is another of convex or concave between the leading edge and the trailing edge.

3. The method of claim 1, wherein when the first member is positioned against the second member, the first member is planar and the second surface is externally facing and is one of convex or concave between the leading edge and the trailing edge, and the method further includes bending the first member so that the first surface forms another of convex or concave between the leading edge and the trailing edge.

4. The method of claim 1, wherein the second member comprises a root core and the first member comprises a root edge radially spaced from the root core.

5. The method of claim 1, wherein the first member comprises a first portion of a root core, the second member comprises a second portion of the root core and the method includes bonding a third member against a first face of the fan first member, wherein the third member comprises a third portion of the root core.

\* \* \* \* \*